US008718555B2

(12) United States Patent
Seidel et al.

(10) Patent No.: US 8,718,555 B2
(45) Date of Patent: *May 6, 2014

(54) METHOD AND SYSTEM FOR USING SELECTED BEARER CHANNELS

(75) Inventors: Scott Y. Seidel, Fairfax, VA (US); Michael R. Franceschini, Centerport, NY (US)

(73) Assignee: Powerwave Cognition, Inc., Santa Ana, CA (US)

( * ) Notice: Subject to any disclaimer, the term of this patent is extended or adjusted under 35 U.S.C. 154(b) by 876 days.

This patent is subject to a terminal disclaimer.

(21) Appl. No.: 11/595,542

(22) Filed: Nov. 10, 2006

(65) Prior Publication Data

US 2008/0112341 A1 May 15, 2008

(51) Int. Cl.
*H04B 7/00* (2006.01)

(52) U.S. Cl.
USPC ......... 455/41.2; 455/62; 455/67.11; 455/418; 455/417; 455/419; 455/420; 455/410; 455/411; 455/435.3; 455/453; 370/338; 370/341

(58) Field of Classification Search
USPC ............... 455/452.2, 452.1, 41.1, 456.2, 41.2
See application file for complete search history.

(56) References Cited

U.S. PATENT DOCUMENTS

| 5,742,593 | A | 4/1998 | Sharony et al. |
| 5,748,147 | A | 5/1998 | Bickley et al. |
| 6,084,919 | A | 7/2000 | Kleider et al. |
| 6,385,434 | B1 | 5/2002 | Chuprun et al. |
| 6,985,737 | B2 * | 1/2006 | Yamaguchi et al. .......... 455/450 |
| 7,239,624 | B2 | 7/2007 | Buchwald et al. |
| 7,787,426 | B2 | 8/2010 | Seidel et al. |
| 8,019,018 | B2 | 9/2011 | Cormier et al. |
| 8,155,127 | B2 | 4/2012 | Seidel et al. |
| 2002/0012337 | A1 | 1/2002 | Schmidl et al. |
| 2003/0050012 | A1 | 3/2003 | Black et al. |
| 2003/0174759 | A1 | 9/2003 | Miyoshi |
| 2003/0198200 | A1 | 10/2003 | Diener et al. |
| 2003/0203721 | A1 | 10/2003 | Berezdivin et al. |
| 2003/0203735 | A1 | 10/2003 | Andrus et al. |
| 2003/0206561 | A1 | 11/2003 | Schmidl et al. |

(Continued)

FOREIGN PATENT DOCUMENTS

EP 1178625 2/2002
EP 1178625 A2 2/2002

(Continued)

OTHER PUBLICATIONS

Seidel, Scott, "*IEEE 802 Tutorial: Cognitive Radio*", 21 pages, Jul. 18, 2005.

(Continued)

*Primary Examiner* — Olumide T Ajibade Akonai
*Assistant Examiner* — Randy Peaches
(74) *Attorney, Agent, or Firm* — Strategic Patents, P.C.

(57) ABSTRACT

Using bearer channels for wireless nodes includes initiating communication among the wireless nodes that include a node and one or more neighbor nodes. An adaptive channel operable to communicate messages between the node and the neighbor nodes is established. One or more bearer channels are selected. The one or more neighbor nodes are notified of the one or more selected bearer channels using the adaptive channel. The node and the neighbor nodes communicate over the bearer channels.

23 Claims, 4 Drawing Sheets

(56) References Cited

U.S. PATENT DOCUMENTS

| | | |
|---|---|---|
| 2003/0210680 A1 | 11/2003 | Rao et al. |
| 2004/0032847 A1 | 2/2004 | Cain |
| 2004/0047324 A1 | 3/2004 | Diener |
| 2004/0058679 A1 | 3/2004 | Dillinger et al. |
| 2004/0085912 A1 | 5/2004 | Xu et al. |
| 2004/0092281 A1 | 5/2004 | Burchfiel |
| 2004/0110493 A1 | 6/2004 | Alvarez et al. |
| 2004/0132496 A1 | 7/2004 | Kim et al. |
| 2004/0172476 A1 | 9/2004 | Chapweske |
| 2004/0220995 A1 | 11/2004 | Tsutsumi |
| 2004/0259503 A1 | 12/2004 | Ogura |
| 2005/0020293 A1 | 1/2005 | Moore |
| 2005/0031047 A1 | 2/2005 | Maltsev et al. |
| 2005/0053032 A1 | 3/2005 | Itoh |
| 2005/0070294 A1 | 3/2005 | Lyle et al. |
| 2005/0083876 A1 | 4/2005 | Vialen et al. |
| 2005/0099957 A1 | 5/2005 | Soldani et al. |
| 2005/0111383 A1* | 5/2005 | Grob et al. .............. 370/254 |
| 2005/0128998 A1 | 6/2005 | Jelitto et al. |
| 2005/0157678 A1 | 7/2005 | Mantha et al. |
| 2005/0197118 A1 | 9/2005 | Mitchell |
| 2005/0259724 A1 | 11/2005 | Bergstrom et al. |
| 2005/0271006 A1 | 12/2005 | Chari et al. |
| 2005/0276317 A1 | 12/2005 | Jeong et al. |
| 2006/0035641 A1 | 2/2006 | Moon et al. |
| 2006/0084444 A1 | 4/2006 | Kossi et al. |
| 2006/0088010 A1 | 4/2006 | Buchwald et al. |
| 2006/0104301 A1 | 5/2006 | Beyer |
| 2006/0126847 A1 | 6/2006 | Ho |
| 2006/0142033 A1 | 6/2006 | Wolman et al. |
| 2006/0146745 A1 | 7/2006 | Cai et al. |
| 2006/0171332 A1 | 8/2006 | Barnum |
| 2006/0198346 A1 | 9/2006 | Liu et al. |
| 2006/0209762 A1 | 9/2006 | Talmola et al. |
| 2006/0215605 A1 | 9/2006 | Srikrishna et al. |
| 2006/0215611 A1* | 9/2006 | Nakagawa et al. ........... 370/332 |
| 2006/0234717 A1 | 10/2006 | Pun |
| 2006/0251019 A1 | 11/2006 | Dalsgaard et al. |
| 2006/0268791 A1 | 11/2006 | Cheng et al. |
| 2006/0268792 A1 | 11/2006 | Belcea |
| 2006/0289650 A1 | 12/2006 | Taylor et al. |
| 2007/0129011 A1 | 6/2007 | Lal et al. |
| 2007/0142067 A1 | 6/2007 | Cheng et al. |
| 2007/0211686 A1 | 9/2007 | Belcea et al. |
| 2007/0237092 A1 | 10/2007 | Balachandran et al. |
| 2007/0249341 A1 | 10/2007 | Chu et al. |
| 2008/0095102 A1 | 4/2008 | Meng et al. |
| 2008/0108358 A1 | 5/2008 | Patel et al. |
| 2009/0298442 A1 | 12/2009 | Adkins |

FOREIGN PATENT DOCUMENTS

| | | |
|---|---|---|
| EP | 1389856 A1 | 2/2004 |
| EP | 1528733 A2 | 5/2005 |
| EP | 1585246 A2 | 10/2005 |
| EP | 1667372 | 6/2006 |
| JP | 2003046595 | 2/2003 |
| JP | 2003046595 A2 | 2/2003 |
| WO | WO-9939472 A1 | 8/1999 |
| WO | WO-2006/039800 A1 | 4/2006 |
| WO | WO-2006/071741 A2 | 7/2006 |
| WO | WO2008/121161 | 10/2008 |
| WO | WO-2008/127420 | 10/2008 |
| WO | WO-2008/127421 | 10/2008 |
| WO | WO-2008/140566 A2 | 11/2008 |
| WO | WO-2008/140566 A3 | 11/2008 |
| WO | WO-2008/140566 A9 | 11/2008 |
| WO | WO-2008/143695 A2 | 11/2008 |
| WO | WO-2008/147447 A2 | 12/2008 |
| WO | WO-2008/156498 A2 | 12/2008 |
| WO | WO-2008/156498 A3 | 12/2008 |
| WO | WO-2008/127421 A3 | 3/2009 |
| WO | WO-2008/147447 A3 | 2/2010 |
| WO | WO-2008/121161 A3 | 3/2010 |
| WO | WO-2008/143695 A3 | 3/2010 |

OTHER PUBLICATIONS

Pending U.S. Appl. No. 11/237,990 entitled, "*Multiple-Transceiver Distributed Dynamic Channel Selection in a Communication Network*", 56 pages specification, claims and abstract, 5 pages of drawings, inventor Stephen P. Hershey, filed Sep. 27, 2005.

Pending U.S. Appl. No. 11/595,719 entitled, "*Autonomous Dynamic Spectrum Access*", 38 pages specification, claims and abstract, 16 pages of drawings, inventors Scott Y. Seidel, et al., filed Nov. 10, 2006.

Pending U.S. Appl. No. 11/595,717 entitled, "*Method and Apparatus for Adjusting Waveform Parameters for an Adaptive Air Interface Waveform*", 33 pages specification, claims and abstract, 3 pages of drawings, inventors Scott Y. Seidel, et al., filed Nov. 10, 2006.

Pending U.S. Appl. No. 11/595,740 entitled, "*Adaptive Control Channel Initialization Operations for Autonomous Dynamic Spectrum Access Systems*", 39 pages specification, claims and abstract, 16 pages of drawings, inventors Scott Y. Seidel, et al., filed Nov. 10, 2006.

Pending U.S. Appl. No. 11/595,716 entitled, "*Scheduling for Autonomous Dynamic Spectrum Access Systems*", 40 pages specification, claims and abstract, 16 pages of drawings, inventor Scott Y. Seidel, filed Nov. 10, 2006.

Pending U.S. Appl. No. 11/595,493 entitled, "*Bearer Selection and Negotiation in Autonomous Dynamic Spectrum Access Systems*", 39 pages specification, claims and abstract, 16 pages of drawings, inventors Scott Y. Seidel, et al., filed Nov. 10, 2006.

Pending U.S. Appl. No. 11/595,718 entitled, "*Interference Avoidance for Autonomous Dynamic Spectrum Access Systems*", 39 pages specification, claims and abstract, 16 pages of drawings, inventors Scott Y. Seidel, et al., filed Nov. 10, 2006.

U.S. Appl. No. 11/595,493, Non-Final Office Action mailed Dec. 29, 2009, 11/595,493 , 18 pgs.

U.S. Appl. No. 11/595,717, Non-Final Office Action mailed Aug. 20, 2009, , 3 pgs.

U.S. Appl. No. 11/595,719, Non-Final Office Action Jan. 27, 2010, , 29 Pgs.

U.S. Appl. No. 11/595,719, Final Office Action mailed Jun. 19, 2009, 11/595,719 , 3 Pgs.

U.S. Appl. No. 11/595,740,Non Final Office Action mailed Nov. 23, 2009, 11/595,740 , 11.

U.S. Appl. No. 11/595,716, Final Office Action mailed Nov. 2, 2009, 11/595,716 , 26 Pgs.

International Application Serial No. PCT/US2007/084371, Search Report and Written Opinion mailed Dec. 16, 2009 , PCT/US2007/084371 , 12.

International Application Serial No. PCT/US2007/084372, Search Report and Written Opinion mailed Dec. 16, 2009, PCT/US2007/084372 , 14 pgs.

International Application Serial No. PCT/US2007/084376, Search Report and Written Opinion mailed Dec. 22, 2009, PCT/US2007/084376 , 12 pgs.

International Serial No. PCT/US2007/021640 mailed Jun. 20, 2008, PCT/US2007/021640 Jun. 20, 2008.

U.S. Appl. No. 11/595,719, NFOA, mailed Mar. 2, 2009, 11/595,719 , all.

U.S. Appl. No. 11/595/716, NFOA, mailed Mar. 3, 2009, , all.

Akyildiz, I F. et al., "NeXt generation/dynamic spectrum access/ cognitive radio wireless networks: A Survey", *Computer Networks* vol. 50. from COGN-0053-PWO ISR/WO of Nov. 20, 2009 May 17, 2009 , 2127-2159.

Bao, Lichun et al., "Channel Access Scheduling in Ad Hoc Networks with Unidirectional Links", *Computer Science Dept. and Computer Engineering Dept., University of CA, 2001* 2001 , 1-10..

Bao, Lichun et al., "Hybrid Channel Access Scheduling in Ad Hoc Networks", *Computer Science Dept. and Computer Engineering Dept., University of CA . 2002* 2002 , 1-12.

(56) References Cited

OTHER PUBLICATIONS

Dimou, K. et al., "Generic Link Layer: A Solution for Multi-Radio Transmission Diversity in Communication Networks beyond 3G", *2005 62nd Vehicular Technology Conference* 25-28, Sep. 2005 , 1672-1676.

ISR, , "International Search Report", PCT/US07/84374 Dec. 8, 2008, all.

ISR, , "PCT/US2007/084370", Mar. 13, 2009.

ISR, , "PCT/US2007/084375", *COGN-0017-PWO PCT Search Report* Jan. 22, 2009 , all.

Jorgenson, M. et al., "Operation of the dynamic TDMA subnet relay system with HF bearers", *2005 IEEE Military Communications Conference*, vol. 1 Oct. 17-20, 2005 , 338-343.

Seidel, S. et al., "Autonomous dynamic spectrum access system behavior and performance", *In DySPAN 2005; First IEEE Symposium on new Frontiers in Dynamic Spectrum Access Networks* Nov. 2005 , 180-183.

Zhao, J et al., ""Distributed coordination in dynamic spectrum allocation networks"", *Proc. IEEE DySPAN 2005 Nov. 2005* Nov. 2005 , 259-268.

U.S. Appl. No. 11/548,763, Non-Final Office Action mailed Mar. 23, 2010, , 19.

U.S. Appl. No. 11/595,740, Notice of Allowance mailed Apr. 15, 2010, , 16.

U.S. Appl. No. 11/595,717, Final Office Action mailed Apr. 19, 2010, , 26.

U.S. Appl. No. 11/595,719, Final Office Action mailed May 14, 2010, , 5.

U.S. Appl. No. 11/595,493, Final Office Action mailed Jul. 16, 2010, , 22.

U.S. Appl. No. 11/595,719, Non-Final Office Action mailed Sep. 2, 2010, , 3.

U.S. Appl. No. 11/595,716, Non-Final Office Action mailed Jan. 6, 2011, , 23.

U.S. Appl. No. 11/595,493, Final Office Action mailed Feb. 2, 2011, , 17.

U.S. Appl. No. 11/595,719, Non-Final Office Action mailed Feb. 25, 2011, , 32.

U.S. Appl. No. 11/548,763, Non-Final Office Action mailed Nov. 18, 2010, , 12.

U.S. Appl. No. 11/595,717, Non-Final Office Action mailed Sep. 24, 2010, , 23.

U.S. Appl. No. 11/595,493, Non-Final Office Action mailed Sep. 22, 2010, , 17.

Seidel, S. et al., ""Autonomous dynamicspectrum access system behavior andperformance"", 2005 1ST IEEE International Symposium on New Frontiers in Dynamic Spectrum Access Networks, Baltimore, MD, USA, Nov. 8, 2005 , 180-183.

Zhi Tian, et al., "A Wavelet Approach to Wideband Spectrum Sensing for Cognitive Radios", In: IEEE Cognitive Radio.Oriented Wireless Networks and Communicat i ons Jun. 8, 2006.

Cai Li, Guo et al., "Investigation on Spectrum Sharing Technology Based on Cogni t i ve Radi o", In: IEEE ChinaCom'06 First International Conference on Comm. and Networking Oct. 25, 2006.

Lehtmiaki, Janne J. et al., "Spectrum Sensing with Forward Methods", In: IEEE Milcom 2006, Oct. 23, 2006.

Scott, D. et al., ""IEEE 802 Tutorial: 1-15 Cognitive Radio",", IEEE, Piscataway, NJ, USA, [Online] URL :http://www.ieee802.org/802_tutorials/0 5-Jul./IEEE%20802%20CR%20Tutorial%207-18-05%20seidel%20input.pdf scott seidel raytheon tutorial Jul. 18, 2005 , 1-21.

U.S. Appl. No. 11/548,763, Notice of Allowance mailed May 11, 2011, 14.

U.S. Appl. No. 11/595,493, Notice of Allowance mailed Jun. 3, 2011, 7.

U.S. Appl. No. 11/595,719, Notice of Allowance mailed Apr. 21, 2011, 5.

U.S. Appl. No. 11/595,716, Final Office Action mailed Jun. 9, 2011, 17.

U.S. Appl. No. 11/595,717, Final Office Action mailed Apr. 14, 2011, 24.

International Application Serial No. PCT/US2007/084373, Search Report and Written Opinion mailed Apr. 14, 2011, , 9.

U.S. Appl. No. 11/595,717, Non Final Office Action Mailed Aug. 15, 2011, , 26.

Akyildiz, I F. et al., "Next generation/dynamic spectrum access/cognitive radio wireless networks: A survey", Computer Networks, Elsevier Science Publishers B.V., Amsterdam, NL ,vol. 50, No. 13, Sep. 15, 2006 , 2127-2159.

Ganesan, G et al., "Cooperative spectrum sensing in cognitive radio networks", 2005 1ST IEEE International Symposium on New Frontiers in Dynamic Spectrum Access Networks, Baltimore, MD , USA, Nov. 8, 2005 , 137-143.

"European Search Report, Appl No. 07875104.7", Oct. 11, 2011 , 1-9.

Jungmin, So et al., "Multi-channel mac for ad hoc networks: handling multi-channel hidden terminals using a single transceiver", Mobihoc 2004. Proceedings of the 5TH. ACM International Symposium on Mobile AD HOC Networking and Computing, Tokyo, Japan May 24-26, 2004 May 24, 2004 , 222-233.

U.S. Appl. No. 11/595,717, Notice of Allowance mailed Jan. 24, 2012, , 11 pgs.

U.S. Appl. No. 11/595,719, Notice of Allowance mailed Dec. 5, 2011, , 9.

"EP Appln No. 07839420.2; Office Action dated Feb. 10, 2012", , 12 pages.

U.S. Appl. No. 07874267.3, Extended European Search Report mailed Apr. 5, 2012, 9 pgs.

"EP appln No. 07875063.5; EP Search Report dated Apr. 2, 2012".

US 8,185,068, May 22, 2012, Seidel, S et al. (withdrawn).

"European Patent Application No. 07874266.5. Office Action dated Mar. 14, 2013", 9 pages.

\* cited by examiner

METHOD AND SYSTEM FOR USING SELECTED BEARER CHANNELS

GOVERNMENT FUNDING

The U.S. Government may have certain rights in this invention as provided for by the terms of Contract No. F30602-03-C-0079 awarded by the United States Air Force Research Laboratory as agent for the Defense Advanced Research Projects Agency (DARPA).

TECHNICAL FIELD

This invention relates generally to the field of wireless communications and more specifically to a method and system for using selected bearer channels.

BACKGROUND

Nodes of a wireless communication system communicate over bearer channels. There are known techniques for using selected bearer channels for transmission. According to a frequency division duplexing (FDD) technique, one channel is used for downlink transmission from a base station node to a remote node, and another channel is used for uplink transmission from the remote node to the base station node. According to a time division duplexing (TDD) technique, a common bearer channel is used for both uplink and downlink transmissions, where uplink and downlink transmissions alternately take turns transmitting on the channel. These known techniques, however, are not suitable for using selected bearer channels in certain situations.

SUMMARY OF THE DISCLOSURE

In accordance with the present invention, disadvantages and problems associated with previous techniques for using selected bearer channels for wireless nodes may be reduced or eliminated.

According to one embodiment of the present invention, using bearer channels for wireless nodes includes initiating communication among the wireless nodes that include a node and one or more neighbor nodes. An adaptive channel operable to communicate messages between the node and the neighbor nodes is established. One or more bearer channels are selected. The one or more neighbor nodes are notified of the one or more selected bearer channels using the adaptive channel. The node and the neighbor nodes communicate over the bearer channels.

Certain embodiments of the invention may provide one or more technical advantages. A technical advantage of one embodiment may be that individual nodes are operable to independently select bearer channels used for communication between the nodes. Accordingly, other network nodes do not need to select identical bearer channels.

A technical advantage of another embodiment may be that example methods for using selected bearer channels for wireless nodes are provided. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes of the network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
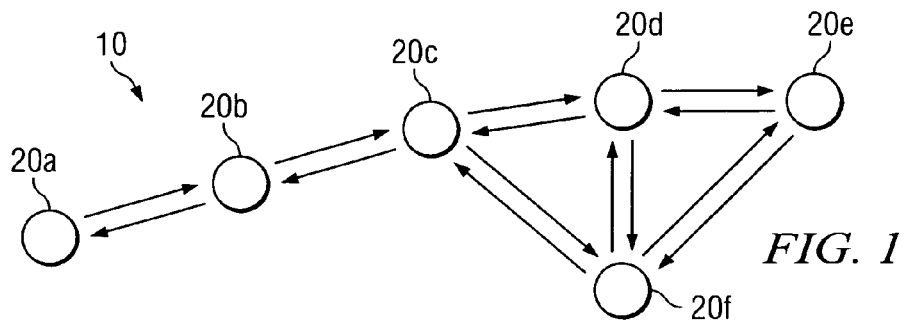
FIG. 1 is a diagram illustrating one embodiment of a network of nodes for which bearer channels may be selected.

FIG. 1 is a diagram illustrating one embodiment of a network 10 of nodes 20 for which bearer channels may be selected. According to the embodiment, nodes 20 are operable to independently select bearer channels used for communication, so other network nodes are not required to select the same bearer channels as one another. Example methods for communicating over the selected bearer channels may be used. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes of network 10.

Network 10 includes devices. In general, a device may include any suitable arrangement of components operable to perform the operations of the device. Components may include logic, an interface, memory, other component, or any suitable combination of the preceding. "Logic" may refer to hardware, software, or a combination of hardware and software. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, network 10 includes nodes 20. A node 20 represents any suitable device operable to communicate with another node 20. Node 20 may comprise, for example, a personal digital assistant, a computer such as a laptop, a cellular telephone, a mobile handset, or any other device operable to communicate with another node 20. A node 20 may have any suitable mobility capability, for example, be stationary or mobile. Nodes 20 may be organized in a base station/remote network topology, a mobile ad-hoc network topology, or any suitable network topology.

Nodes 20 communicate using signals. A signal may have any suitable modulation format and any suitable bandwidth. Signals communicate information. Information may include voice, data, text, audio, video, multimedia, control, signaling, other information, or any combination of the preceding. The information may be communicated in packets. A packet may comprise a bundle of data organized in a specific way for transmission, and a frame may comprise the payload of one or more packets organized in a specific way for transmission.

According to one embodiment, a network 10 may have one or more bearer channels simultaneously selected by nodes 20. The channel selection may be made according to any suitable method. The bearer channels may be used for communications among nodes 20 according to any suitable method. A procedure according to which a method may be selected from a set of example methods is described in more detail with reference to FIG. 2. The set of example methods includes a transmitter-oriented method, a destination-oriented method, a link-oriented method, and a group-oriented method. Any suitable procedure for selecting a method from any suitable set of methods, however, may be used.

Bearer channels selected for use by a node 20 may change independently from the method for using the selected bearer channels. The method uses the current bearer channel that was selected by any suitable means.

Modifications, additions, or omissions may be made to network 10 without departing from the scope of the invention. The components of network 10 may be integrated or separated according to particular needs. Moreover, the operations of network 10 may be performed by more, fewer, or other modules. Additionally, operations of network 10 may be performed using any suitable logic.

Figure 2:
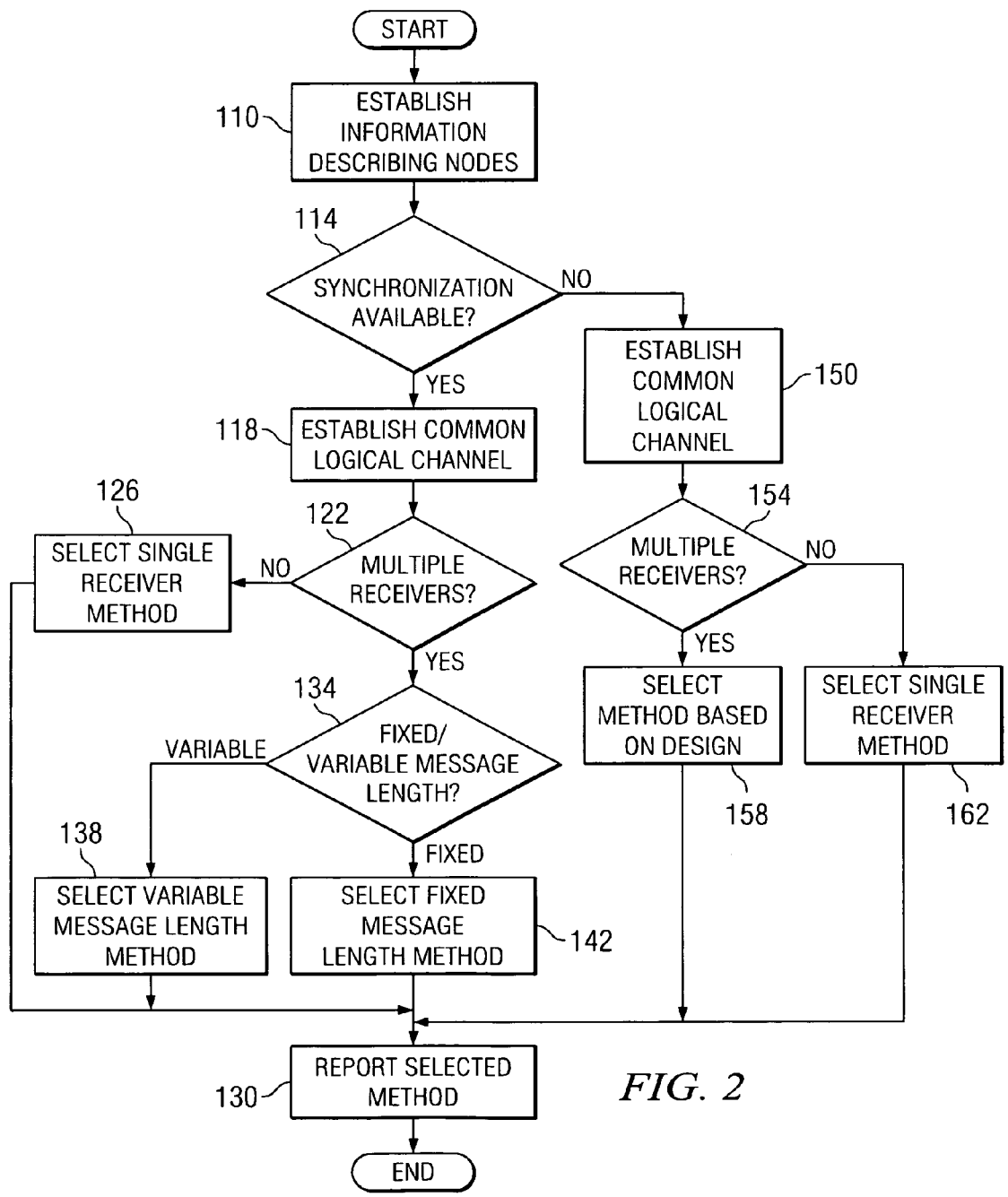
FIG. 2 is a flowchart illustrating one embodiment of procedure for identifying an appropriate method for using selected bearer channels.

FIG. 2 is a flowchart illustrating one embodiment of a procedure for identifying an appropriate method for using selected bearer channels. The technique may be used to identify methods for any suitable network of nodes, such as network 10 of nodes 20 of FIG. 1.

The procedure begins at step 110, where information describing network 10 of nodes 20 is established. Time synchronization may be available among nodes 20 at step 114. Time synchronization may refer to highly accurate time synchronization. If time synchronization is available, nodes 20 may utilize a time division multiple access (TDMA) technique, a carrier sense multiple access (CSMA) technique, or other suitable technique. If time synchronization is not available, nodes 20 may utilize a CSMA technique or other suitable technique.

If time synchronization is available at step 114, the procedure proceeds to step 118, where a common logical channel is determined. Nodes 20 may have multiple receivers at step 122. If nodes 20 do not have multiple receivers at step 122, the procedure proceeds to 126, where a method appropriate for single receiver nodes 20 is selected. Single receiver methods may include, for example, a single receiver destination-oriented method, a single receiver transmitter-oriented method, or a group-oriented method. A single receiver transmitter-oriented method is described with reference to FIG. 3. A single receiver destination-oriented method is described with reference to FIG. 5. A group-oriented method is described with reference to FIG. 8. After a single receiver method is selected, the procedure proceeds to step 130.

If nodes 20 have multiple receivers at step 122, the procedure proceeds to step 134. The frames of the message traffic may have a variable message length or a fixed method length at step 134. If the message length is variable at step 134, the procedure proceeds to step 138. A method appropriate for a variable message length is selected at step 138. Methods appropriate for a variable message length may include a multiple receiver destination-oriented method, a link-oriented method, or a group-oriented method. A multiple receiver destination-oriented method is described with reference to FIG. 6. A link-oriented method is described with reference to FIG. 7. The procedure then proceeds to step 130.

If the message length is fixed at step 134, the procedure proceeds to step 142. A method appropriate for a fixed message length is selected at step 142. Methods appropriate for a fixed message length may include, for example, a multiple receiver transmitter-oriented method, a link-oriented method, or a group-oriented method. A multiple receiver transmitter-oriented method is described with reference to FIG. 4. The procedure then proceeds to step 130.

If time synchronization is not available at step 114, the procedure proceeds to step 150, where a common logical channel is determined. Nodes 20 may have multiple receivers at step 154. If nodes 20 have multiple receivers at step 154, the procedure proceeds to step 158, where a selection method is selected in accordance with the design of nodes 20. As an example, a destination-oriented method, a transmitter-oriented method, a link-oriented method, or a group-oriented method may be selected. The procedure then proceeds to step 130.

If nodes 20 do not have multiple receivers at step 154, the procedure proceeds to step 162, where a single receiver method is selected. A single receiver method may include, for example, a single receiver destination-oriented method or a group-oriented method. After a single receiver method is selected, the procedure proceeds to step 130. At step 130, the selected method is reported. After reporting the selected method, the procedure terminates.

Modifications, additions, or omissions may be made to the procedure without departing from the scope of the invention. The procedure may include more, fewer, or other steps. Additionally, steps may be performed in any suitable order without departing from the scope of the invention.

Figure 3:
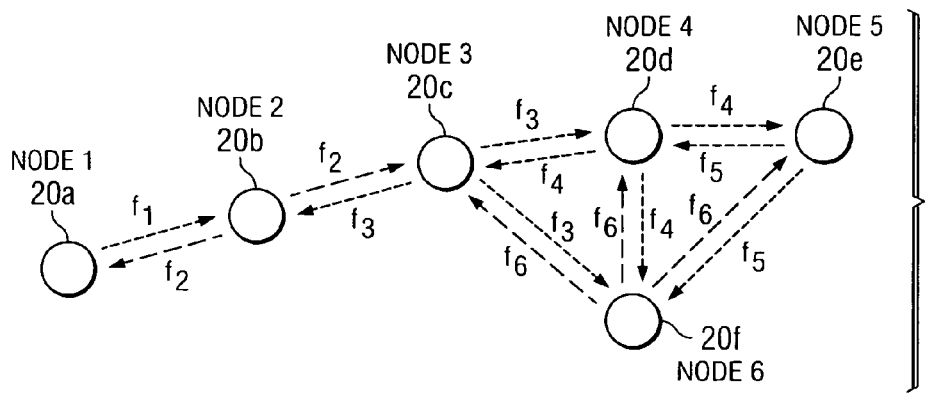
FIG. 3 is a diagram illustrating one embodiment of a transmitter-oriented (TO) method for using selected bearer channels for wireless nodes having a one or more receivers.

FIG. 3 is a diagram illustrating one embodiment of a transmitter-oriented (TO) method for using selected bearer channels for nodes having one or more receivers. The method may be used for any suitable network of nodes, such as network 10 of nodes 20 of FIG. 1. According to the embodiment, nodes 20 may operate according to a time division multiple access (TDMA) technique.

According to the illustrated embodiment, each node 20 transmits using its own selected bearer channel. In the example, node 1 transmits over channel $f_1$, node 2 transmits over channel $f_2$, node 3 transmits over channel $f_3$, node 4 transmits over $f_4$, node 5 transmits over channel $f_5$, and node 6 transmits over channel $f_6$. Different nodes 20 may select the same or different bearer channels. As an example, channels $f_1$ and $f_3$ may be equal to each other, and channels $f_1$, $f_2$, $f_4$, and $f_5$ may be different from each other.

According to one embodiment, a frame may be used to organize a collection of consecutive TDMA time slots. The frames may include, for example, one or more network entry slots, one or more control slots, one or more data slots, one or more other slots, or any combination of the preceding. Network entry slots may be used to join a network and indicate selected bearers. Control slots may include information used to designate current and future bearer channels. Data slots may be used for data payload. Slots may go unused when there is no data to send, or dummy payloads may be used to fill unused slots. The frequency of the network entry slot may be determined according to any suitable method. In one embodiment, the frequency may be a pre-assigned fixed channel. In other embodiments, the frequency may be a dynamically changing channel determined according to any suitable procedure.

According to the TDMA technique, a schedule is established according to any suitable method to define the specific time slots that a node 20 uses for transmission. In one embodiment, each node 20 may be assigned a fixed time slot in every repeating frame. In other embodiments, the time slots may be dynamically assigned by a master node or according to any other suitable method. Nodes 20 tune to the bearer channel of a transmitting node 20 for the time slot of the transmitting node 20 as specified by the schedule.

Modifications, additions, or omissions may be made to the method without departing from the scope of the invention. The method may include more, fewer, or other steps. Additionally, steps may be performed in any suitable order without departing from the scope of the invention.

Figure 4:
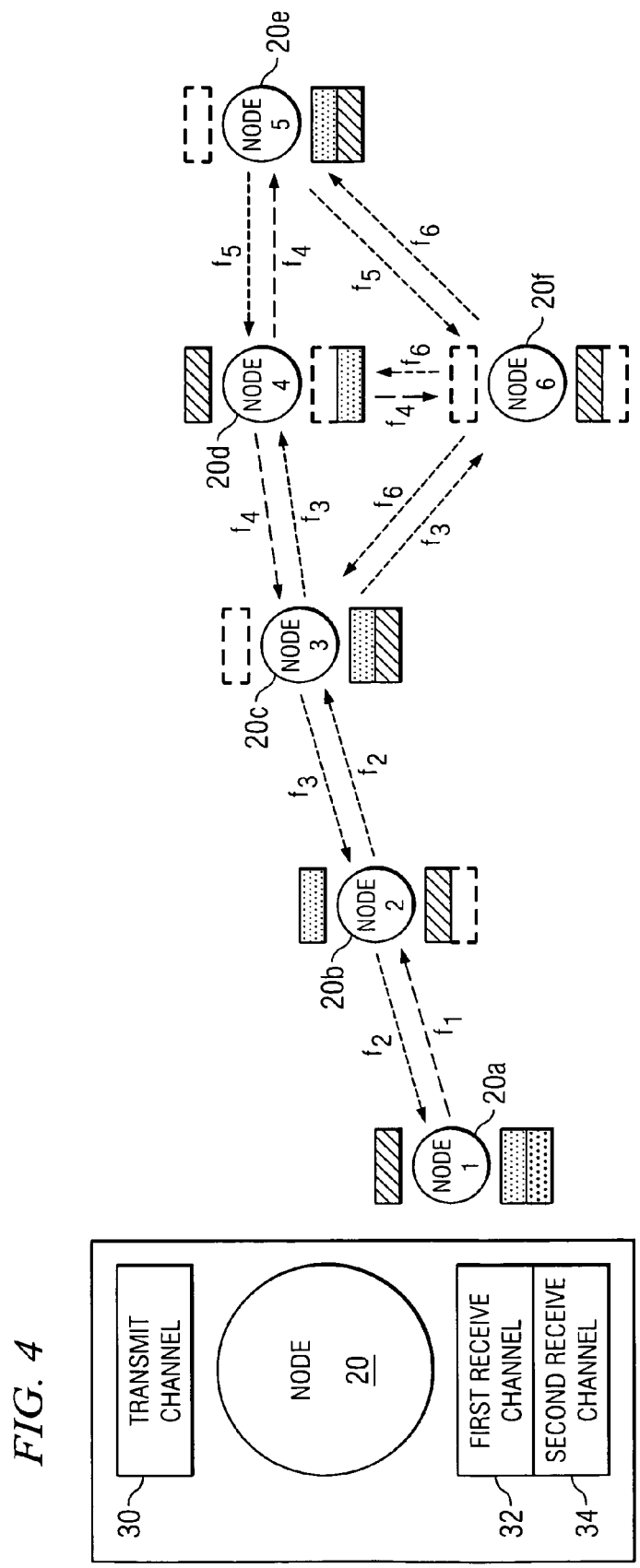
FIG. 4 is a diagram illustrating one embodiment of a transmitter-oriented (TO) method for using selected bearer channels for wireless nodes having multiple receivers.

FIG. 4 is a diagram illustrating one embodiment of a transmitter-oriented (TO) method for using selected bearer channels for nodes having multiple receivers. The method may be used for any suitable network of nodes, such as network 10 of nodes 20 of FIG. 1. According to the embodiment, nodes 20 may operate according to a carrier sense multiple access technique.

According to the key of FIG. 4, each node 20 transmits over its own bearer channel 30. Each node 20 may transmit over its own bearer channel in a manner similar to that described with reference to FIG. 3.

Each node 20 receives over two or more bearer channels. A bearer channel may be selected such that each neighbor node 20 that is one hop away from a transmitting node 20 has at least one receiver tuned to the bearer channel of the transmitting node 20. Accordingly, a node 20 has a receiver tuned to the bearer channel in use by its neighbor nodes 20. A hop may refer to a communication link between two nodes 20. In the example, node 1 receives over channels $f_2$ and $f_6$, node 2 receives over channels $f_1$ and $f_3$, node 3 receives over channels $f_1$ and $f_2$, node 4 receives over channels $f_2$ and $f_3$, node 5 transmits receives over channels $f_1$ and $f_2$, and node 6 transmits receives over channels $f_1$ and $f_3$.

Modifications, additions, or omissions may be made to the method without departing from the scope of the invention. The method may include more, fewer, or other steps. Additionally, steps may be performed in any suitable order without departing from the scope of the invention.

Figure 5:
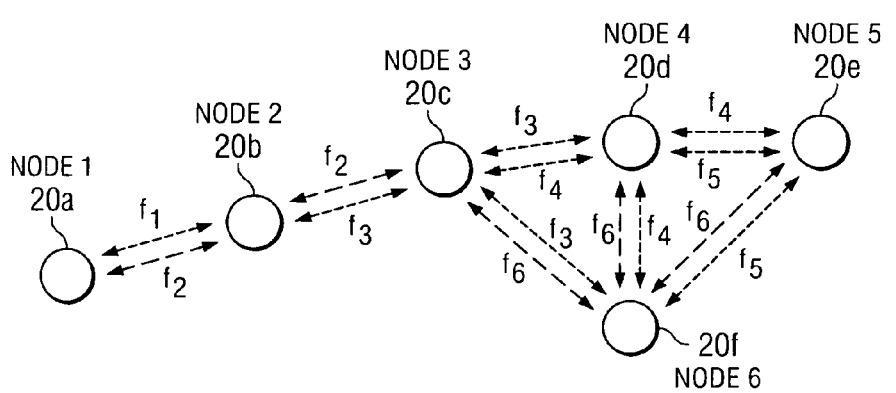
FIG. 5 is a diagram illustrating one embodiment of a destination-oriented (DO) method for using selected bearer channels for wireless nodes having a single receiver.

FIG. 5 is a diagram illustrating one embodiment of a destination-oriented (DO) method for using selected bearer channels for wireless nodes having a single receiver. The method may be used for any suitable network of nodes, such as network 10 of nodes 20 of FIG. 1. According to the embodiment, nodes 20 may operate according to a carrier sense multiple access (CSMA) technique.

According to the embodiment, when a node 20 has data to send to a one-hop neighbor destination node 20, the bearer channel of the destination node 20 is used for the handshake and data exchange.

The handshake and data exchange involve data source and destination transmitting, so both nodes 20 transmit and receive on the bearer frequency specified by the destination node 20. A handshake may refer to a CSMA handshake comprising a request to send (RTS) message, a clear to send (CTS) message, a data message, and an acknowledge (ACK) message.

According to the example, nodes 1 and 2 transmit and receive over channels $f_1$ and $f_2$, nodes 2 and 3 transmit and receive over channels $f_2$ and $f_3$, nodes 3 and 4 transmit and receive over channels $f_3$ and $f_4$, nodes 4 and 5 transmit and receive over channels $f_4$ and $f_5$, nodes 3 and 6 transmit and receive over channels $f_3$ and $f_6$, and nodes 5 and 6 transmit and receive over channels $f_5$ and $f_6$. According to the illustrated embodiment, channels $f_1$ and $f_3$ may be equal.

Modifications, additions, or omissions may be made to the method without departing from the scope of the invention. The method may include more, fewer, or other steps. Additionally, steps may be performed in any suitable order without departing from the scope of the invention.

Figure 6:
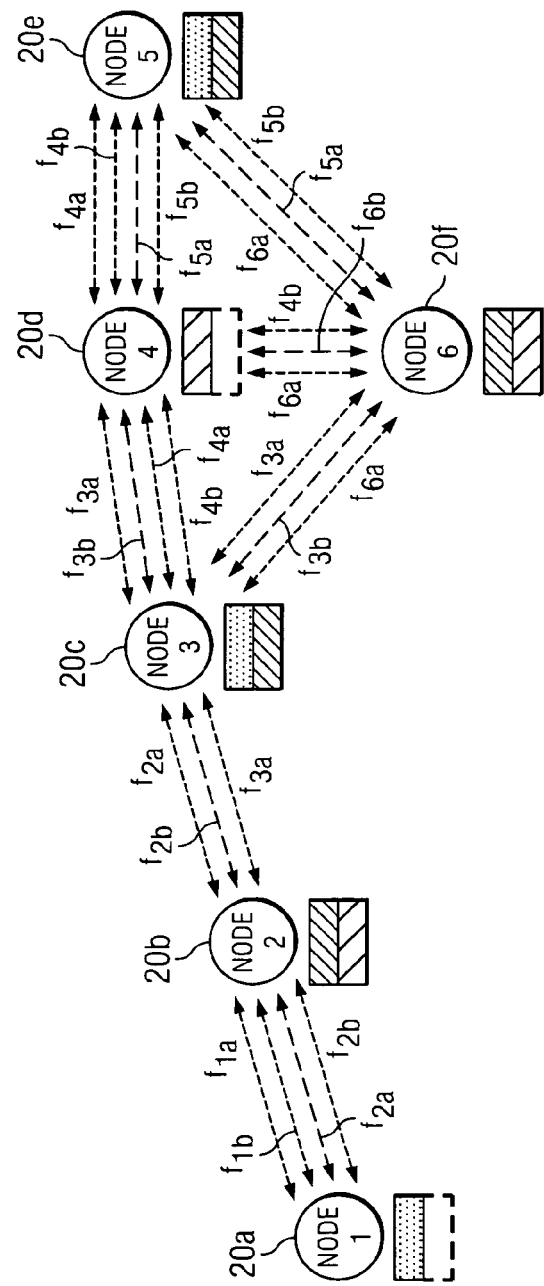
FIG. 6 is a diagram illustrating one embodiment of a destination-oriented (DO) method for using selected bearer channels for wireless nodes having multiple receivers.
Figure 6:
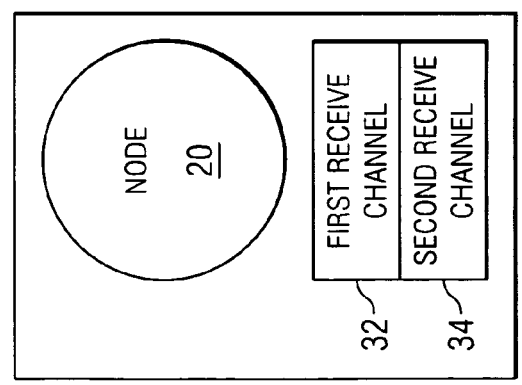

FIG. 6 is a diagram illustrating one embodiment of a destination-oriented (DO) method for using selected bearer channels for nodes having multiple receivers. The method may be used for any suitable network of nodes, such as network 10 of nodes 20 of FIG. 1. According to the embodiment, nodes 20 may operate according to a carrier sense multiple access technique.

According to the embodiment, when a node 20 has data to send to a one-hop neighbor destination node 20, one of the two or more bearer channels of the destination node 20 is used for the handshake and data exchange. The handshake and data exchange involve data source and destination transmitting, so both nodes 20 transmit and receive on the bearer frequencies specified by the destination node 20. The bearer channels may be selected in a manner similar to that described with reference to FIG. 5.

According to the illustrated example, nodes 1 and 2 transmit and receive over channels $f_{1a}$, $f_{1b}$, $f_{2a}$, and $f_{2b}$; nodes 2 and 3 transmit and receive over channels $f_{2a}$, $f_{2b}$, $f_{3a}$; nodes 3 and 4 transmit and receive over channels $f_{3a}$, $f_{3b}$, $f_{4a}$, and $f_{4b}$; nodes 4 and 5 transmit and receive over channels $f_{4a}$, $f_{4b}$, $f_{5a}$, and $f_{5b}$; nodes 3 and 6 transmit and receive over channels $f_{3a}$, $f_{3b}$, and $f_{6a}$; and nodes 5 and 6 transmit and receive over channels $f_{5a}$, $f_{5b}$, and $f_{6a}$. According to the illustrated example, frequencies $f_{1a}$, $f_{3a}$, and $f_{5b}$ may be equal, frequencies $f_{1b}$ and $f_{4b}$ may be equal, and frequencies $f_{2b}$, $f_{4a}$, and $f_{6a}$ may be equal.

Modifications, additions, or omissions may be made to the method without departing from the scope of the invention. The method may include more, fewer, or other steps. Additionally, steps may be performed in any suitable order without departing from the scope of the invention.

Figure 7:
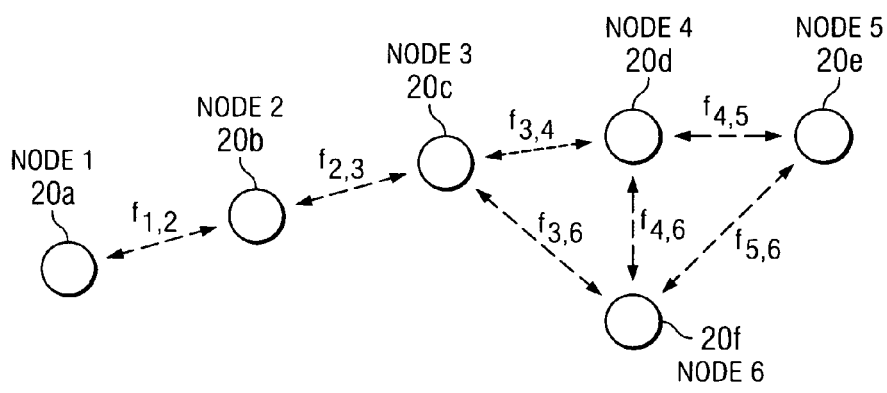
FIG. 7 is a diagram illustrating one embodiment of a link-oriented (LO) method for selecting and using bearer channels for wireless nodes having multiple receivers.

FIG. 7 is a diagram illustrating one embodiment of a link-oriented (LO) method for using selected bearer channels for wireless nodes having multiple receivers. The method may be used for any suitable network of nodes, such as network 10 of nodes 20 of FIG. 1. According to the embodiment, nodes 20 may operate according to a time division multiple access (TDMA) technique, a carrier sense multiple access (CSMA) technique, or any other suitable technique.

According to the embodiment, a node 20 may select a bearer channel for use on a link-by-link basis. The bearer channel may be used to both transmit and receive signals between a pair of nodes. In the illustrated embodiment, a frequency $f_{x,y}$ may designate the frequency for a bearer channel between nodes x and y. A node 20 may communicate with a neighbor node 20 using the bearer channel specified for the link between them.

Modifications, additions, or omissions may be made to the method without departing from the scope of the invention. The method may include more, fewer, or other steps. Additionally, steps may be performed in any suitable order without departing from the scope of the invention.

Figure 8:
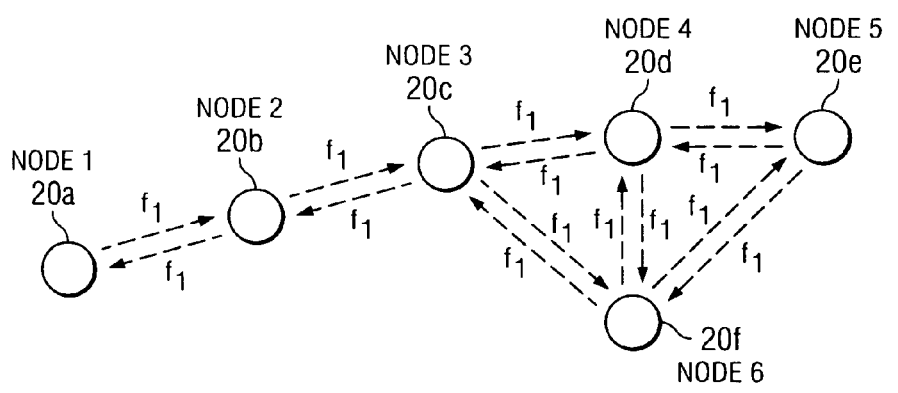
FIG. 8 is a diagram illustrating one embodiment of a group-oriented (GO) method for selecting and using bearer channels for wireless nodes having a single receiver.

FIG. 8 is a diagram illustrating one embodiment of a group-oriented method (GO) for using selected bearer channels for wireless nodes. The method may be used for any suitable network of nodes, such as network 10 of nodes 20 of FIG. 1. According to the embodiment, nodes 20 may operate according to a time division multiple access (TDMA) technique, a carrier sense multiple access (CSMA) technique, or any other suitable technique.

Nodes 20 may select a common bearer channel for use across nodes 20 of system 10. The nodes 20 transmit on the common bearer channel. When a new common bearer channel is selected, the nodes 20 switch to use the new channel. A master node 20 may notify nodes 20 of the selected bearer channel.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that individual wireless nodes are operable to independently select bearer channels used for communication between the wireless nodes. Accordingly, other network nodes do not need to select identical bearer channels.

A technical advantage of another embodiment may be that example methods for using selected bearer channels for wireless nodes are provided. As a first example, a transmission may use the bearer channel of a transmitting node for communication between the transmitting node and a destination node. As a second example, the transmission may use the bearer channel of a destination node. As a third example, each node may use bearer channels selected on a link-by-link basis. As a fourth example, a master node may select a bearer channel for use by the nodes.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for using one or more bearer channels for one or more wireless nodes, comprising:
    initiating communication among a plurality of wireless nodes, the plurality of wireless nodes comprising a node and one or more neighbor nodes;
    establishing an adaptive channel operable to communicate a plurality of messages through an ad hoc network between the node and the one or more neighbor nodes;
    independently selecting one or more bearer channels in each wireless node;
    notifying the one or more neighbor nodes of the one or more selected bearer channels using the adaptive channel; and
    communicating between the node and the one or more neighbor nodes over the one or more selected bearer channels, wherein when the node has data to send to a one-hop neighbor of the one or more neighbor nodes, a one of the bearer channels of the one-hop neighbor is selected for a handshake and data exchange with the one-hop neighbor.

2. The method of claim 1, wherein communicating between the node and the one or more neighbor nodes over the one or more selected bearer channels further comprises:
    using a bearer channel selected by the node when operating as a transmitting node; and
    notifying the one or more neighbor nodes of the one or more selected bearer channel.

3. The method of claim 1, wherein communicating between the node and the one or more neighbor nodes over the one or more selected bearer channels further comprises:
    using a bearer channel selected by the node when operating as a transmitting node; and
    notifying the one or more neighbor nodes of the selected bearer channel, the neighbor node located one or more hops away from the transmitting node, the neighbor node having at least one receiver of a plurality of receivers tuned to the selected bearer channel.

4. The method of claim 1, wherein communicating between the node and the one or more neighbor nodes over the one or more selected bearer channels further comprises:
    using a bearer channel selected by the node when operating as a destination node; and
    notifying the one or more neighbor nodes of the selected bearer channel.

5. The method of claim 1, wherein communicating between the node and the one or more neighbor nodes over the one or more selected bearer channels further comprises:
    using a bearer channel selected by the node when operating as a destination node; and
    notifying the one or more neighbor nodes of the selected bearer channel, a node operating as a transmitting node located one or more hops away from a neighbor node, the transmitting node and the destination node each having at least one receiver of a plurality of receivers tuned to the selected bearer channel.

6. The method of claim 1, wherein communicating between the node and the one or more neighbor nodes over one or more selected bearer channels further comprises:
    using a bearer channel selected on a link-by-link basis.

7. The method of claim 1, wherein communicating between the node and the one or more neighbor nodes over one or more selected bearer channels further comprises:
    receiving at the node a notification of the selected bearer channel from a master node of the plurality of wireless nodes; and
    receiving at the one or more neighbor nodes the notification of the selected bearer channel from the master node.

8. A wireless node operable to communicate with one or more other wireless nodes, comprising:
    an interface operable to send and receive signals; and
    a processor operable to:
        initiate communication with one or more other wireless nodes;

establish an adaptive channel operable to communicate a plurality of messages through an ad hoc network with the one or more other wireless nodes;

independently select one or more bearer channels in each wireless node;

notify one or more neighbor nodes of the one or more selected bearer channels using the adaptive channel; and communicate with the one or more other wireless nodes over the one or more selected bearer channels, wherein when the node has data to send to a one-hop neighbor of the one or more neighbor nodes, a one of the bearer channels of the one-hop neighbor is selected for a handshake and data exchange with the one-hop neighbor.

9. The wireless node of claim 8, the processor further operable to:
notify the one or more other wireless nodes of the one or more selected bearer channels.

10. The wireless node of claim 8, the processor further operable to:
notify the one or more other wireless nodes of the one or more selected bearer channels, the other wireless node of the one or more other wireless nodes located one or more hops away from the wireless node, the other wireless node having at least one receiver of a plurality of receivers tuned to the selected bearer channel.

11. The wireless node of claim 8, the processor further operable to communicate with the one or more other wireless nodes over the one or more selected bearer channels by:
using the one or more bearer channels selected by a wireless node when operating as a transmitting node.

12. The wireless node of claim 8, the processor further operable to communicate with the one or more other wireless nodes over the one or more selected bearer channels by:
using the one or more bearer channels selected by a wireless node when operating as a destination node.

13. The wireless node of claim 8, the processor further operable to communicate with the one or more other wireless nodes over the one or more selected bearer channels by:
using the one or more bearer channels selected on a link-by-link basis.

14. The wireless node of claim 8, the processor further operable to communicate with the one or more other wireless nodes over the one or more selected bearer channels by:
receiving a notification of the one or more selected bearer channels from a master node.

15. A network for using one or more bearer channels for one or more wireless nodes, comprising:
a plurality of wireless nodes comprising:
a node; and
one or more neighbor nodes;
the plurality of wireless nodes operable to:
initiate communication;
establish an adaptive channel operable to communicate a plurality of messages through an ad hoc network between the node and the one or more neighbor nodes;
independently select one or more bearer channels in each wireless node;
notify the one or more neighbor nodes of the one or more selected bearer channels using the adaptive channel; and
communicate between the node and the one or more neighbor nodes over the one or more selected bearer channels, wherein when the node has data to send to a one-hop neighbor of the one or more neighbor nodes, a one of the bearer channels of the one-hop neighbor is selected for a handshake and data exchange with the one-hop neighbor.

16. The network of claim 15, the plurality of wireless nodes operable to communicate between the node and the one or more neighbor nodes over the one or more selected bearer channels by:
using a bearer channel selected by the node when operating as a transmitting node; and
notifying the one or more neighbor nodes of the selected bearer channel.

17. The network of claim 15, the plurality of wireless nodes operable to communicate between the node and the one or more neighbor nodes over the one or more selected bearer channels by:
using a bearer channel selected by the node when operating as a transmitting node; and
notifying the one or more neighbor nodes of the selected bearer channel, the neighbor node located one or more hops away from the transmitting node, the neighbor node having at least one receiver of a plurality of receivers tuned to the selected bearer channel.

18. The network of claim 15, the plurality of wireless nodes operable to communicate between the node and the one or more neighbor nodes over the one or more selected bearer channels by:
using a bearer channel selected by the node when operating as a destination node; and
notifying the one or more neighbor nodes of the selected bearer channel.

19. The network of claim 15, the plurality of wireless nodes operable to communicate between the node and the one or more neighbor nodes over the one or more selected bearer channels by:
using a bearer channel selected by the node when operating as a destination node; and
notifying the one or more neighbor nodes of the selected bearer channel, a node operating as a transmitting node located one or more hops away from a neighbor node, the transmitting node and the destination node each having at least one receiver of a plurality of receivers tuned to the selected bearer channel.

20. The network of claim 15, the plurality of wireless nodes operable to communicate between the node and the one or more neighbor nodes over the one or more selected bearer channels by:
using the bearer channel selected on a link-by-link basis.

21. The network of claim 15, the plurality of wireless nodes operable to communicate between the node and the one or more neighbor nodes over the one or more selected bearer channels by:
receiving at the node a notification of a selected bearer channel from a master node of the plurality of wireless nodes; and
receiving at the one or more neighbor nodes the notification of the selected bearer channel from the master node.

22. A system for using one or more bearer channels for one or more wireless nodes, comprising:
means for initiating communication among a plurality of wireless nodes, the plurality of wireless nodes comprising a node and one or more neighbor nodes;
means for establishing an adaptive channel operable to communicate a plurality of messages through an ad hoc network between the node and the one or more neighbor nodes;
means for independently selecting one or more bearer channels in each wireless node;

means for notifying the one or more neighbor nodes of the one or more selected bearer channels using the adaptive channel; and means for communicating between the node and the one or more neighbor nodes over the one or more selected bearer channels, wherein when the node has data to send to a one-hop neighbor of the one or more neighbor nodes, a one of the bearer channels of the one-hop neighbor is selected for a handshake and data exchange with the one-hop neighbor.

23. A method for using one or more bearer channels for one or more wireless nodes, comprising:

initiating communication among a plurality of wireless nodes, the plurality of wireless nodes comprising a node and one or more neighbor nodes;

establishing an adaptive channel operable to communicate a plurality of messages through an ad hoc network between the node and the one or more neighbor nodes;

independently selecting one or more bearer channels in each wireless node;

notifying the one or more neighbor nodes of the one or more selected bearer channels using the adaptive channel; and communicating between the node and the one or more neighbor nodes over the one or more selected bearer channels by:

using a bearer channel selected by the node when operating as a transmitting node;

notifying the one or more neighbor nodes of the selected bearer channel, the neighbor node located one or more hops away from the transmitting node, the neighbor node having at least one receiver of a plurality of receivers tuned to the selected bearer channel;

using a bearer channel selected by the node when operating as a destination node;

selecting a bearer channel of a one-hop neighbor node for a handshake and data exchange with the one-hop neighbor when the node has data to send to the one-hop neighbor of the one or more neighbor nodes;

notifying the one or more neighbor nodes of the selected bearer channel, a node operating as a transmitting node located one or more hops away from a neighbor node, the transmitting node and the destination node each having at least one receiver of a plurality of receivers tuned to the selected bearer channel;

using a bearer channel selected on a link-by-link basis;

receiving at the node a notification of a selected bearer channel from a master node of the plurality of wireless nodes; and receiving at the one or more neighbor nodes the notification of the selected bearer channel from the master node.

* * * * *